United States Patent [19]

Ilardi et al.

[11] 3,717,698

[45] Feb. 20, 1973

[54] MANUFACTURE OF SODA ASH FROM WYOMING TRONA

[75] Inventors: Joseph M. Ilardi, East Brunswick; Eric Rau, Trenton, both of N.J.

[73] Assignee: International Research and Development Corp., Green River, Wyoming

[22] Filed: Jan. 29, 1971

[21] Appl. No.: 111,118

[52] U.S. Cl. ................................423/206, 423/184
[51] Int. Cl. ..............................................C01d 7/30
[58] Field of Search ..23/63, 298, 300, 302; 423/206, 423/184

[56] References Cited

UNITED STATES PATENTS

| | | | |
|---|---|---|---|
| 1,984,342 | 12/1934 | Hellmers | 23/63 |
| 2,989,369 | 6/1961 | Osborne | 23/63 X |

OTHER PUBLICATIONS

Hackh's Chemical Dictionary, page 481 (4th edition McGraw-Hill 1969).
Mellor, Inorganic & Theoretical Chemistry, Vol. 10, page 476 (Longmans, Green & Co., 1947).

*Primary Examiner*—Edward J. Meros
*Assistant Examiner*—Charles B. Rodman
*Attorney*—Milton Zucker, Frank Ianno, Eugene E. Seems and Pauline Newman

[57] ABSTRACT

Soda ash is prepared from crude trona containing organic impurities by calcining the crude trona to produce crude soda ash containing the organic impurities, dissolving the resultant anhydrous sodium carbonate in aqueous medium to produce a substantially saturated solution of sodium carbonate containing organics, and deactivating the organics with hydrogen peroxide, activated by sodium persulfate.

2 Claims, No Drawings

3,717,698

MANUFACTURE OF SODA ASH FROM WYOMING TRONA

BACKGROUND OF THE INVENTION

In the last two decades, the classic Solvay process for the preparation of soda ash—anhydrous sodium carbonate—has been challenged successfully by the exploitation of the beds of sodium sesquicarbonate (trona) which underlie a large area in southwestern Wyoming. A similar deposit exists in Kenya. Substantially all the growth in soda ash capacity in the United States for this period has been in the utilization of this deposit.

Two basic processes have been used commercially in the processing of the ore, which typically contains, in addition to more than 90 percent of sodium sesquicarbonate, traces of sodium chloride, sodium sulfate and $Fe_2O_3$, several tenths of a percent of organic matter, and 5 to 7 percent of insolubles, largely silicates. One process dissolves the sesquicarbonate as such, treats the solution to remove insolubles and organic matter, and then crystallizes sodium sesquicarbonate, which may be used as such or calcined to soda ash. The resultant soda ash is pseudomorphic in form after the crystal pattern of the sodium sesquicarbonate, and special additives are needed to get desirable crystal properties. Moreover, the crystal structure is different from that obtained by the conventional Solvay process, so that the product is sometimes difficult to substitute for conventional Solvay process soda ash.

The second basic process for handling natural trona produces a product which is like Solvay process ash. In this process, the trona is first calcined to crude soda ash; the ash is dissolved, and the solution treated to remove insolubles. The resultant solution is crystallized to produce sodium carbonate monohydrate crystals, which are then treated to remove the water of hydration and produce soda ash.

The organics present in the crude trona must be removed, or compensated for, if satisfactory crystals, which will produce ash of acceptable physical structure, are to be obtained in the crystallization—whether monohydrate, which is the product of commerce, or anhydrous soda ash, which can be produced in known fashion by the use of special crystallizing conditions (see Seaton et al. U. S. Pat. No. 2,770,524, issued Nov. 13, 1956). If the organics are not removed, poor crystals are produced, and the product occupies too large a volume, making it uneconomic to ship and handle. Additionally, foaming occurs in the crystallizer, complicating processing.

The standard method for removing organics is to use columns containing activated carbon, through which the crude sodium carbonate solution is pumped; the organics are adsorbed by the carbon, resulting in a solution which will yield crystals in a desirable fashion. This method requires a substantial capital outlay for carbon-treating columns and pumps, and a continuous outlay for treating chemicals, but it has been used in commercial installations for lack of a better method.

It has been suggested (U. S. Pat. No. 2,989,369, issued June 20, 1961) that treatment of the solution with $Cl_2$ or $Br_2$ prior to crystallization will deactivate the organics, but since several tenths of a percent of halogen are needed, the process is impractical because of inherent corrosion problems. The patentees prefer to treat their finished sodium carbonate with dry $Cl_2$ gas to improve the product.

An alternate method is to calcine the crude trona at a temperature high enough to burn off the organics without fusing the crude trona. Such a process is described in Seglin et al U. S. Pat. No. 2,962,348, issued Nov. 29, 1960. However, high calcination temperatures have not been used commercially because they induce a reaction between the sodium carbonate and the insoluble silicates present in the ore, to produce sodium silicates, which go into solution and contaminate the product. The amount of silica solubilized depends on the time and temperature of calcination. Even at minimum temperatures (about 375°C) needed to burn off the organics, enough $SiO_2$ is solubilized to sodium silicate to cause difficulties in the crystallizer. As a result, this route has not met with commercial acceptance.

OBJECT OF THIS INVENTION

It is the object of this invention to produce soda ash from trona by the precalcination process without the necessity for expensive carbon treatment to remove organics.

STATEMENT OF THE INVENTION

This object is attained, in accordance with this invention, by using, in the standard process for making soda ash in which crude trona is calcined to crude soda ash at a temperature too low to deactivate the organics, the crude ash is dissolved to make a saturated aqueous solution, the insolubles and organics are largely removed, and the sodium carbonate is then crystallized and calcined to soda ash, the step which comprises deactivating the organics before crystallization, at a temperature not in excess of 75°C, with aqueous hydrogen peroxide activated with sodium persulfate, using at least as much active oxygen derived from hydrogen peroxide as the amount of oxygen needed to produce $CO_2$ from the organics by direct combustion at elevated temperatures. Unexpectedly, the process increases the bulk density of the soda ash over that obtained by conventional carbon treatment.

DETAILED DESCRIPTION OF THE INVENTION

In operating in accordance with this invention, we convert crude trona to soda ash by the commercial low-temperature calcination process in which crude trona is calcined to crude soda ash at temperatures too low to destroy or deactivate the organics (350°C or less), the crude soda ash is made into a saturated sodium carbonate solution containing suspended solids and organics, the solids are removed, and the solution is then treated to neutralize organics before crystallization and calcination to soda ash. We can use any of the standard variations of the process; the novelty and invention lie in our method of deactivating the organics.

We do this by adding to the solution an aqueous active oxygen solution containing hydrogen peroxide together with sodium persulfate to activate the hydrogen peroxide. At least sufficient hydrogen peroxide is used to produce stoichiometric amounts of active oxygen, with optimum results about twice stoichiometric. The stoichiometric amount of oxygen needed can be determined by oxidizing the organics in a muffle furnace, and collecting the $CO_2$ formed; or the same figure can be obtained by titration with a standard bichromate solution.

The sodium persulfate comprises about 5 to 15 percent of the total weight of the solution when the standard 30 percent aqueous hydrogen peroxide of commerce is used, less when more concentrated solutions are used, i.e., it is present to about one-sixth to one-half of the weight of 100 percent hydrogen peroxide, most preferably about one-third of the weight of 100 percent hydrogen peroxide.

The treatment is a simple one, involving simple addition of the desired amount of peroxide-persulfate with the hot clarified sodium carbonate solution, and holding for a short period. This can be accomplished by adding the peroxygen solution to the hold tanks which are used to feed the crystallizer, eliminating the entire carbon-treating section of conventional plants.

The temperature at which the clarified liquor must be held cannot be over 75°C, since the hydrogen peroxide decomposes at higher temperatures without acting on the organics. Some peroxide is lost even below 75°C, but good results are obtained using amounts of hydrogen peroxide from stoichiometric to twice stoichiometric.

For reasons of heat economy, the sodium carbonate solution should be at a temperature of at least 50°C, although the hydrogen peroxide will work even at ordinary ambient temperatures. We have found about 60°C to be an acceptable temperature for general operation. At this temperature, the reaction is complete in 10 to 15 minutes, but a hold time of 30 minutes is convenient. At temperatures of 70° to 75°C, the reaction is complete in a few minutes; at lower temperatures, somewhat longer times, up to an hour, are necessary, depending on the temperature.

After the hold period, the solution is heated to the desired crystallization temperature, and fed to the crystallizer.

The process puts no undesirable contaminants into the product, and has the unexpected result that products of substantially higher bulk density of the order of 25% can be obtained.

EXAMPLES OF THE INVENTION

Example A

A typical sample of natural trona from Green River was calcined for 1 hour at 150°C in a muffle furnace to produce a crude ash containing 12 percent of water-insolubles. Enough of this calcined ore was dissolved in distilled water to give, after filtration, 1,690 grams of 30 percent sodium carbonate solution having a dissolved organic level of 140 parts per million (ppm) as soluble carbon. This aqueous ash solution was maintained at 60°C with stirring. Into the 60°C sodium carbonate solution was placed 0.309 gram of $H_2O_2$, which amounts to only 25 percent of that needed to totally oxidize the carbon in the 1,690 grams of solution to $CO_2$. The active oxygen was added in the form of a solution consisting of 90 percent (30% $H_2O_2$) and 10 percent of $Na_2S_2O_8$ which was acting as an activator and was not considered to donate to the calculated $H_2O_2$ value of 0.309 gram. After the two solutions ($Na_2CO_3$ solution and $H_2O_2$—$Na_2S_2O_8$) were mixed and let stand for 30 minutes, with stirring, the soluble organic level dropped from 140 to 120 ppm.

The monohydrate nonsteady state crystals (see definitions at end of examples) grown showed poor habit and a low bulk density of 40 pounds per cubic foot (which is equivalent to 60 pounds per cubic foot for steady state crystals). This is essentially no improvement over the crystals grown from a solution not treated with $H_2O_2$—$Na_2S_2O_8$, which also had a bulk density of approximately 60 pounds per cubic foot as anhydrous.

EXAMPLE 1

An $Na_2CO_3$ solution was prepared similar to that outlined in Example A, also having 140 ppm of soluble carbon. In this second case, 1.237 grams of $H_2O_2$ was added to the 1,690 grams of solution, which represents enough active oxygen in the form of $H_2O_2$ to totally oxidize the dissolved organics. The solution carbon level was dropped (after 30 minutes) from 140 to 70 ppm. The crystals now grown were better than Example 1, having a nonsteady state bulk density of 43 pounds per cubic foot, which is equivalent to 63 pounds per cubic foot as anhydrous.

EXAMPLE 2

Same procedure as carried out in Examples A and 1, except that now 2.474 grams of $H_2O_2$ was added, which is two times the amount of oxygen needed to convert the carbon to $CO_2$. The concentration of soluble organics now dropped from 140 to 38 ppm of carbon. The resulting crystals grown were of a superior nature, having a nonsteady state bulk density of 52 pounds per cubic foot and a steady state bulk density of 72 pounds per cubic foot as anhydrous.

DEFINITIONS OF CRYSTALS

Nonsteady State Crystals: Those grown under high degrees of supersaturation and low agitation levels. These conditions cause the crystals to grow in an elongated fashion and excessive twinning is noted. These misshapen and needlelike crystals were produced in a batch crystallizer.

Steady State Crystals: Those grown under lower degrees of supersaturation and higher agitation in a continuous laboratory crystallizer. If one were to take a solution of $Na_2CO_3$ and water and grow monohydrate crystals, the nonsteady state crystals would be needlelike, whereas the steady state material would be equidimensional.

Obviously, the examples can be multiplied without departing from the invention, which is defined in the claims.

We claim:

1. In the process for making soda ash in which Wyoming trona is calcined to crude soda ash containing organic impurities which interfere with crystallization, the crude soda ash is dissolved in water and the solution is clarified to remove insolubles, and the solution is crystallized, the improvement which comprises adding to the solution before crystallization at least enough hydrogen peroxide to yield active oxygen equivalent stoichiometrically to the organic impurities in the solution, and sodium persulfate in amount from one-sixth to one-half of the weight of the hydrogen peroxide, holding for a time before crystallization, at a temperature not in excess of 75°C, to permit the peroxide to act on the organics, and thereafter crystallizing sodium carbonate monohydrate from the solution.

2. The method of claim 1, in which the hydrogen peroxide is added in at least about twice the stoichiometric quantity, whereby improved crystals of increased bulk density are obtained.

* * * * *

UNITED STATES PATENT OFFICE
CERTIFICATE OF CORRECTION

Patent No. 3,717,698      Dated February 20, 1973

Inventor(s) Joseph M. Ilardi and Eric Rau

It is certified that error appears in the above-identified patent and that said Letters Patent are hereby corrected as shown below:

Cover page [73], Assignee "International" should read --Intermountain--.

Column 3, line 65, "$Na_2S_2O$which" should read --$Na_2S_2O_8$ which--.

Signed and sealed this 17th day of December 1974.

(SEAL)
Attest:

McCOY M. GIBSON JR.
Attesting Officer

C. MARSHALL DANN
Commissioner of Patents